(12) United States Patent
Lee et al.

(10) Patent No.: US 9,768,627 B2
(45) Date of Patent: Sep. 19, 2017

(54) OVERCHARGE PROTECTION APPARATUS WITH MINIMIZED POWER CONSUMPTION

(71) Applicant: SK INNOVATION CO., LTD., Seoul (KR)

(72) Inventors: Yun Nyoung Lee, Gyeonggi-do (KR); Jeong Woon Ko, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 110 days.

(21) Appl. No.: 14/831,323

(22) Filed: Aug. 20, 2015

(65) Prior Publication Data
US 2016/0056646 A1 Feb. 25, 2016

(30) Foreign Application Priority Data

Aug. 21, 2014 (KR) .................. 10-2014-0109071

(51) Int. Cl.
*H02J 7/06* (2006.01)
*H02J 7/24* (2006.01)
(Continued)

(52) U.S. Cl.
CPC .............. *H02J 7/0031* (2013.01); *B60L 1/00* (2013.01); *B60L 3/0046* (2013.01); *B60L 3/04* (2013.01);
(Continued)

(58) Field of Classification Search
CPC .................................................. H02J 7/0031
(Continued)

(56) References Cited

U.S. PATENT DOCUMENTS 4,280,161 A * 7/1981 Kuhn ................. H02H 7/065
361/104
8,354,818 B2 * 1/2013 Louch ................. H02J 7/35
320/101
(Continued)

FOREIGN PATENT DOCUMENTS

JP 2014-030281 2/2014
KR 2019980055789 10/1998
KR 1020130009175 1/2013

OTHER PUBLICATIONS

The extended European search report issued by the European Patent Office on Jan. 22, 2016.
(Continued)

*Primary Examiner* — Suresh Memula
(74) *Attorney, Agent, or Firm* — IP & T Group LLP

(57) ABSTRACT

Disclosed herein is an overcharge protection apparatus with minimized power consumption. An overcharge protection apparatus with minimized power consumption according to an embodiment includes a switching unit for controlling supply of voltage detected in a battery cell depending on an ignition-on or off state of a vehicle, and an overcharge prevention circuit for, when the battery cell is overcharged based on the voltage of the battery cell output from the switching unit, turning off a main relay, thus interrupting supply of power to a battery module, so that the voltage of the battery cell is detected only in an ignition-on state of a vehicle and power consumption is minimized, thus preventing the lifespan of a battery from being shortened by reducing a voltage difference between cells.

7 Claims, 2 Drawing Sheets

(51) Int. Cl.
  *H02J 7/00* (2006.01)
  *B60L 3/04* (2006.01)
  *H02H 1/06* (2006.01)
  *B60L 1/00* (2006.01)
  *B60L 3/00* (2006.01)
  *B60R 16/03* (2006.01)

(52) U.S. Cl.
  CPC ............ *H02H 1/06* (2013.01); *H02J 7/0077* (2013.01); *B60L 2240/547* (2013.01); *B60R 16/03* (2013.01); *H02J 2007/0037* (2013.01)

(58) Field of Classification Search
  USPC ........................................................ 320/163
  See application file for complete search history.

(56) References Cited

U.S. PATENT DOCUMENTS

| | | | |
|---|---|---|---|
| 8,917,058 B2 * | 12/2014 | Hirai | H02J 7/1423 |
| | | | 307/150 |
| 2009/0001926 A1 | 1/2009 | Sato | |
| 2011/0101915 A1 * | 5/2011 | Mitsutani | B60K 6/445 |
| | | | 320/109 |
| 2011/0260544 A1 | 10/2011 | Imai et al. | |
| 2012/0019191 A1 * | 1/2012 | Yoshida | B60L 11/1885 |
| | | | 320/101 |
| 2012/0025768 A1 * | 2/2012 | Nakano | B60L 11/005 |
| | | | 320/116 |

OTHER PUBLICATIONS

Office Action issued by the Korean Intellectual Property Office on Jul. 26, 2016.

\* cited by examiner

OVERCHARGE PROTECTION APPARATUS WITH MINIMIZED POWER CONSUMPTION

CROSS REFERENCE TO RELATED APPLICATION

This application claims the benefit of Korean Patent Application No. KR2014-0109071, filed Aug. 21, 2014, entitled "Overcharge Protection Apparatus with Minimum Power Consumption", winch is hereby incorporated by reference in its entirety into this application.

BACKGROUND OF THE INVENTION

1. Technical Field

The present invention relates to an overcharge protection apparatus with minimized power consumption.

2. Description of the Related Art

Generally, a lithium-ion battery that is a rechargeable battery may explode or ignite when overcharged to a predetermined voltage or more. Further, a battery module typically includes multiple battery cells to acquire a required output. If at least one of the battery cells included in the battery module is overcharged to explode or ignite, not only the corresponding battery cell which has been overcharged, but also remaining battery cells are also influenced, and thus it is essential to prevent the overcharge of a battery in order to guarantee the safety of the battery.

An electrical overcharge protection apparatus is connected to one of the cells included in a battery module and continuously monitors the voltage of the battery cell. Such an electrical overcharge protection apparatus is configured to, when the battery cell is overcharged and the voltage of the battery cell increases above a predetermined voltage, release connection between the battery module and a charging power source.

However, a conventional electrical overcharge protection apparatus is disadvantageous in that it is always electrically connected to the battery cell so as to monitor the voltage of the battery cell, thus steadily consuming constant power.

Therefore, when the battery is left as it is for a long period of time, there occurs a difference between the voltage of the battery cell, for which overcharge is detected, and the voltages of the remaining cells due to the power consumption of the electrical overcharge protection apparatus.

Since a large-capacity battery cell has a large storage capacity, a difference between the cell voltages is not very large. However, since a small-capacity battery cell has a small storage capacity, a voltage difference relatively increases, thus shortening the lifespan of the battery due to the degradation of the battery cell.

The following patent document described in the prior art documents relates to a power system that is capable of reducing a dark anent flowing through a state monitoring circuit while assigning a state monitoring function using the state monitoring circuit, in a power system having multiple storage batteries and a semiconductor switching element as an opening/closing means. In the following patent document, when the power of a vehicle is turned off metal-oxide-semiconductor (MOS) switches 21 and 22 are turned off, so that current is prevented from flowing into a voltage detection circuit 40 from respective storage batteries 12 and 14 through the semiconductor switch units of respective MOS switches 21 and 22, thus reducing a dark current in the power-off state of the vehicle.

PRIOR ART DOCUMENTS

Patent Documents (Patent Document 1) JP2014-30181 A

SUMMARY OF THE INVENTION

Accordingly, the present invention is intended to provide an overcharge protection apparatus with minimized power consumption, which detects the voltage of a battery cell only in the ignition-on state of a vehicle and minimizes power consumption, thus preventing the lifespan of a battery from being shortened by reducing a voltage difference between cells.

In accordance with an aspect of the present invention, there is provided an overcharge protection apparatus with minimized power consumption, including a switching unit for controlling supply of voltage detected in a battery cell depending on an ignition-on or off state of a vehicle; and an overcharge prevention circuit for, when the battery cell is overcharged based on the voltage of the battery cell output from the switching unit, turning, off a main relay, thus interrupting supply of power to a battery module.

In an embodiment, the switching unit may include a fast relay that does not supply the voltage of the battery cell to the overcharge prevention circuit in an ignition-off state of the vehicle, and that supplies the voltage of the battery cell to the overcharge prevention circuit in an ignition-on state of the vehicle.

In an embodiment, the first relay may include a first coil and a first switch, the first relay being configured such that when current flows through the first coil, the first switch is closed, whereas when current does not flow through the first coil, the first switch is opened, and such that the first switch is connected at as first end thereof to an anode of the battery cell, the overcharge prevention circuit may include a voltage detection unit connected between a second end of the first switch and a cathode of the battery cell and configured to detect the voltage of the battery cell; a switching diode connected at a first end thereof to the cathode of the battery cell, and configured to be shorted when the voltage of the battery cell detected by the voltage detection unit is equal to or greater than a reference voltage; and a second relay including a second coil connected between the second end of the first switch and a second end of the switching diode, and as second switch connected between a first end of the first coil of the first relay and a ground, and the main relay may include a third coil and a third switch, the main relay being configured such that a first end of the third coil is provided with a relay control signal from a battery management system and a second end of the third coil is connected to a second end of the first coil, and such that a first end of the third switch is connected to the battery module and a second end of the third switch is connected to a charging power source.

In an embodiment, the relay control signal may be at a low level in the ignition-off state of the vehicle, and be at a high level in the ignition-on state of the vehicle.

In an embodiment, when current does not flow through the second coil of the second relay, a connection between contact points of the second switch may be made such that the first end of the first coil is connected to the ground, and when current flows through the second coil of the second relay, the connection between the contact points of the second switch may be made such that the first end of the first coil is disconnected from the ground.

In an embodiment, the second relay may include a latching relay, and may be configured such that a connection between the contact points of the second switch in the latching relay is continuously maintained unless reverse current flows through the second coil of the latching relay.

In an embodiment, the first relay may include a first coil and a first switch, the first switch is connected at a first end thereof to an anode of the battery cell and at a second end thereof to the overcharge prevention circuit, and a first end of the first coil is connected to the ground and a second end of the rust coil is provided with a relay control signal from a battery management system.

Features and advantages of the present invention will be more clearly described from the following detailed description made based on the attached drawings.

Prior to the description of the present invention, the terms or words used in the present specification and claims should not be construed as being limited to ordinary meanings or dictionary definitions. Meanwhile, the present invention should be understood to have meanings and concepts coping with the technical spirit of the present invention based on the principle that an inventor can appropriately define the concepts of terms in order to best describe his or her invention.

DESCRIPTION OF THE PREFERRED EMBODIMENTS

Figure 1:
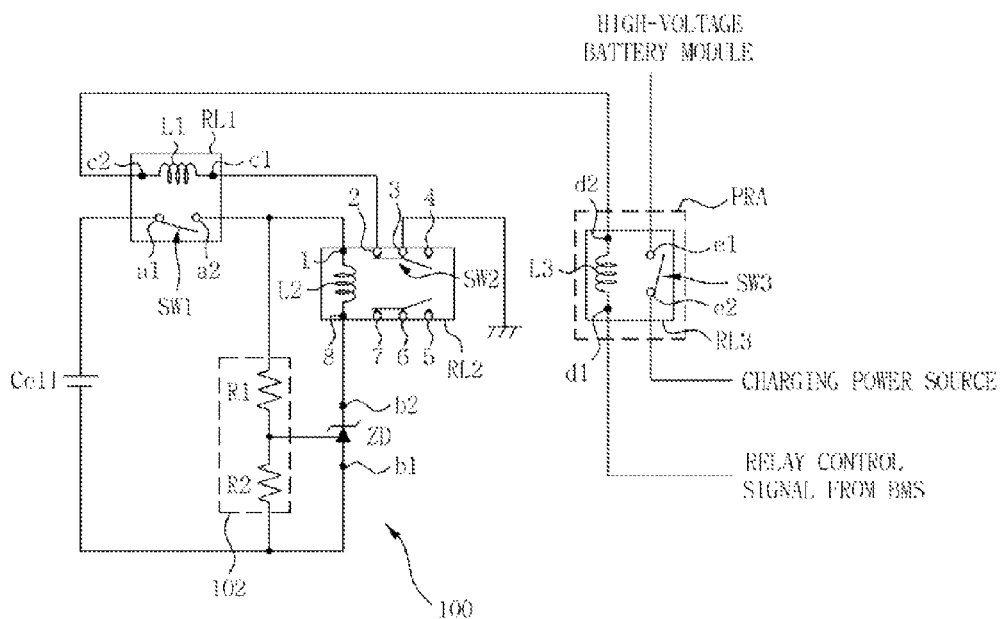
FIG. 1 is a circuit diagram showing an overcharge protection apparatus with minimized power consumption according to a first embodiment of the present invention.

The objects, specific advantages, and new features of the present invention will be more clearly understood from the following detailed description taken in conjunction with the accompanying drawings.

It should be noted that the same reference numerals are used to designate the same or similar elements throughout the different drawings.

Further, the terms such as "first," "second," "first end," and "second end" are used to distinguish one component from other components, and those components are not limited by the terms.

In the following description of the present invention, detailed descriptions of known technologies that are deemed to make the gist of the present invention obscure will be omitted.

Hereinafter, exemplary embodiments of the present invention will be described in detail with reference to the attached drawings.

FIG. 1 is a circuit diagram showing an overcharge protection apparatus with minimized power consumption according to a first embodiment of the present invention.

The overcharge protection apparatus with minimized power consumption according to the first embodiment of the present invention includes a first relay RL1 as a switching unit for controlling the supply of voltage detected in a battery cell (Cell) depending on the ignition (starting) state of a vehicle; and an overcharge prevention circuit 100 for interrupting the supply of power from a charging power source to a high-voltage battery module (not shown) by turning of a main relay RL3 included in a Power Relay Assembly (PRA) when the battery cell is overcharged based on the voltage of the battery cell output from the first relay RL1.

The first relay RL1 supplies the voltage of the battery cell to the overcharge prevention circuit 100 only in the ignition-on state of the vehicle, and does not supply the voltage of the battery cell to the overcharge prevention circuit 100 in the ignition-off state of the vehicle.

The first relay RL1 includes a first coil L1 and a first switch SW1, and is configured such that, when current flows through the first coil L1, the first switch SW1 is closed whereas when current does not flow through the first coil L1, the first switch SW1 is opened, and such that the first end a1 of the first switch SW1 is connected to the anode of the battery cell.

The overcharge prevention circuit 100 includes a voltage detection unit 102 which is connected between the second end a2 of the first switch SW1 and the cathode of the battery cell and is composed of resistors R1 and R2 for detecting the voltage of the battery cell; a switching diode ZD which is connected at its first end b1 to the cathode of the battery cell and is shorted when the voltage of the battery cell detected by the voltage detection unit 102 is equal to or greater than a reference voltage; and a second relay RL2 which includes a second coil L2 connected between the second end a2 of the first switch SW1 and the second end b2 of the switching diode ZD, and a second switch SW2 connected between the first end c1 of the first coil L1 of the first relay RL1 and a ground.

The first end c1 of the first coil L1 is connected to the second contact point 2 of the second switch SW2, the third contact point 3 of the second switch SW2 is connected to the ground and the fourth contact point 4 of the second switch SW2 is opened.

The main, relay RL3 includes a third coil L3 and a third switch SW3, wherein a relay control signal from a Battery Management System (BMS) is applied to the first end d1 of the third coil L3, and the second end d2 of the third coil L3 is connected to the second end c2 of the first coil L1. Further, the first end e1 of the third switch SW3 is connected to the high-voltage battery module, and the second end e2 of the third switch SW3 is connected to a charging power source.

In the first embodiment of the present invention, the second relay RL2 is a latching relay, and the second rely RL2 implemented as the latching relay is operated such that, when the battery cell is overcharged in the ignition-on state of the vehicle, current flows through the second coil L2 within the latching relay RL2, and a connection between the contact points 2 and 3 of the second switch SW2 is released, and thus the first end c1 of the first coil L1 is disconnected from the ground. Such a state is continuously maintained unless reverse current flows through the second coil L2.

The operation of the overcharge protection apparatus with minimized power consumption according to the first embodiment of the present invention, configured as above, is described below.

In the ignition-off state of the vehicle, the relay control signal from the BMS is a low-level voltage, and thus current does not flow through the first coil L1 of the first relay RL1, and thus the first switch SW1 is opened.

When the first switch SW1 is opened, the voltage of the battery cell is not supplied to the overcharge prevention circuit 100.

Therefore, since the power of the battery cell is not supplied to the overcharge prevention circuit 100 in the ignition-off state of the vehicle, the power of the battery cell is not consumed.

Figure 2:
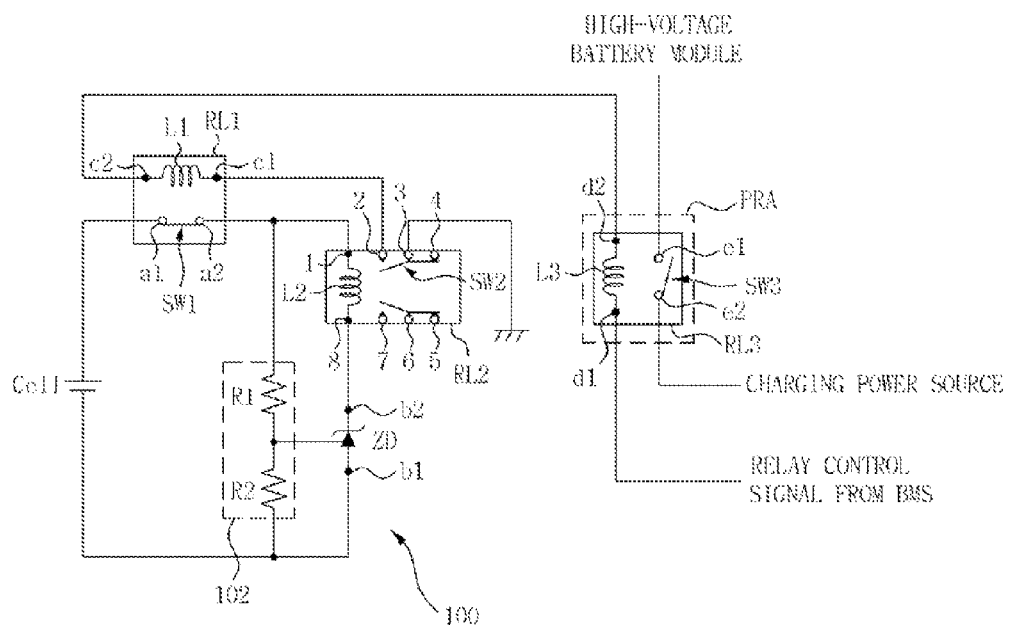
FIG. 2 is a diagram showing the operation of the overcharge protection apparatus with minimized power consumption, shown in FIG. 1, according to the first embodiment in the case of overcharge.

FIG. 2 is a diagram showing the operation of an overcharge protection apparatus with minimized power consumption shown in FIG. 1 according, to the first embodiment of the present invention in the case of overcharge.

In the ignition-on state of the vehicle, a relay control signal from the battery management system (BMS) is a high-level voltage, so that current flows through the first coil L1 of the first relay RL1, thus causing the first switch SW1 to be closed.

When the first switch SW1 is closed, the voltage of the battery cell is applied to the overcharge prevention circuit 100, and then the overcharge prevention circuit 100 is normally operated.

The contact points 2 and 3 of the second relay RL2 implemented as the latching relay are initially electrically connected to each other, and are maintained in the initial state unless current flows through the second coil L2.

Therefore, in the ignition-on state of the vehicle, a relay control signal from the BMS is a high-level voltage, and current flows through the first coil L1 of the first relay RL1, so that the first switch SW1 is closed, and then current flows through the third coil L3 of the main relay RL3. Therefore, the third switch SW3 is closed, and then the high-voltage battery module is connected to the charging power source.

However, when the battery cell is overcharged and the voltage thereof is increased above, for example, 4.7 V, a voltage equal to or greater than the reference voltage is detected by the voltage detection unit 102, and the switching diode ZD is turned on, and then current flows through the second coil L2 of the second relay RL2. As a result, the contact points 3 and 4 of the second switch SW2 are electrically connected to each other, whereas the connection between the contact points 2 and 3 is released.

When the connection between the contact points 2 and 3 of the second switch SW2 is released, the contact point 2 is disconnected from the ground, and current does not flow through the third coil L3. As a result, the third switch SW3 is opened, and the supply of power from the charging power source to the high-voltage battery module is interrupted to prevent overcharge, thus preventing the ignition and explosion of the high-voltage battery module.

In the first embodiment of the present invention, the second relay RL2 is implemented as a latching relay. The latching relay is continuously maintained in its current state unless reverse current flows through the second coil L2.

Accordingly, when the battery cell is overcharged, the state of the second relay RL2 is not changed, so that the connection between the contact points 2 and 3 of the second relay RL2 is continuously maintained in a released state, and the supply of power from the charging power source to the high-voltage battery module is continuously interrupted, thus preventing the overcharge of the battery cell.

As described above, in accordance with the first embodiment of the present invention, the first relay RL1 is turned on only in the ignition-on state of the vehicle, that is, only when the battery is used, so that the power from the battery cell is supplied to the overcharge prevention circuit 100. In the ignition-off state of the vehicle, the first relay RL1 is turned off so that the power from the battery cell is not supplied to the overcharge prevention circuit 100. Accordingly, the power consumption of the battery cell is minimized and the voltage difference between cells is reduced, thus preventing the lifespan of the battery from being shortened.

Figure 3:
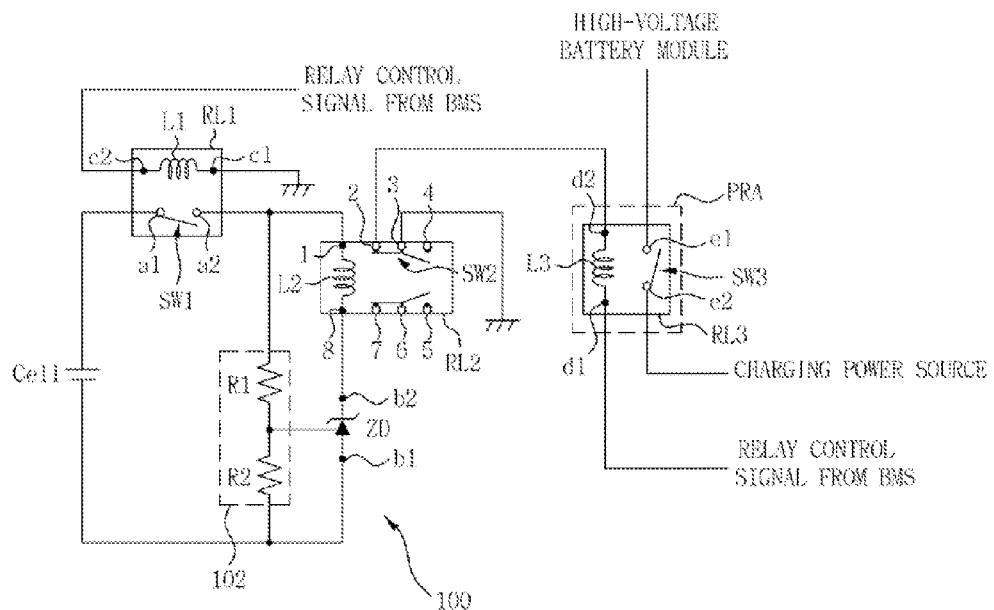
FIG. 3 is a circuit diagram showing an overcharge protection apparatus with minimized power consumption according to a second embodiment of the present invention.

FIG. 3 is as circuit diagram showing an overcharge protection apparatus with minimized power consumption according to a second embodiment of the present invention.

The overcharge protection apparatus with minimized power consumption, shown in FIG. 3, according to the second embodiment of the present invention includes a first relay RL1 as a switching unit for controlling the supply of voltage detected in a battery cell (Cell) depending on the ignition state of a vehicle; and an overcharge prevention circuit 100 for interrupting the supply of power from a charging power source to a high-voltage battery module (not shown) by turning off a main relay RL3 when the battery cell is overcharged based on the voltage of the battery cell output from the first relay RL1.

The first relay RL1 supplies the voltage of the battery cell to the overcharge prevention circuit 100 in the ignition-on state of the vehicle, and does not supply the voltage of the battery cell to the overcharge prevention circuit 100 in the ignition-off state of the vehicle.

The first relay RL1 includes a first coil L1 and a first switch SW1, and is configured such that, when current flows through the first coil L1, the first switch SW1 is closed, whereas when current does not flow through the first coil L1, the first switch SW1 is opened, and such that the first end a1 of the first switch SW1 is connected to the anode of the battery cell.

The overcharge prevention circuit 100 includes a voltage detection unit 102 which is connected between the second end a2 of the first switch SW1 and the cathode of the battery cell and is composed of resistors R1 and R2 for detecting the voltage of the battery cell; a switching diode ZD which is connected at its first end b1 to the cathode of the battery cell and is shorted when the voltage of the battery cell detected by the voltage detection unit 102 is equal to or greater than a reference voltage; and a second relay RL2 which includes a second coil 12 connected between the second end a2 of the first switch SW1 and the second end b2 of the switching diode ZD, and a second switch SW2 connected between the third coil L3 of the main relay RL3 and a ground.

The main relay RU includes a third coil L3 and a third switch SW3, wherein a relay control signal from a Battery Management System (BMS) is applied to the first end d1 of the third coil L3, and the second end d2 of the third coil L3 is connected to the second contact point 2 of the second switch SW2. Further, the first end e1 of the third switch SW3 is connected to the high-voltage battery module, and the second end e2 of the third switch SW3 is connected to a charging power source.

The third contact point 3 of the second switch SW2 is connected to the ground, and the fourth contact point 4 of the second switch SW2 is opened.

The first end c1 of the first coil L1 is connected to the ground, and a relay control signal from the BMS is applied to the second end c2 of the first coil L1.

In the second embodiment of the present invention, the second relay RL2 is a latching relay, and the second rely RL2 implemented as the latching relay is operated such that when the battery cell is overcharged in the ignition-on state of the vehicle, current flows through the second coil L2 within the latching relay RL2, and a connection between the contact points 2 and 3 of the second switch SW2 is released, and thus the second end d2 of the third coil. L3 is disconnected from the ground. Such a state is continuously maintained unless reverse current flows through the second coil L2.

The operation of the overcharge protection apparatus with minimized power consumption according to the second embodiment of the present invention, configured as above, is described below.

In the ignition-off state of the vehicle, the relay control signal from the BMS is a low-level voltage, and thus current does not flow through the first coil L1 of the first relay RL1, and thus the first switch SW1 is opened.

When the first switch SW1 is opened, the voltage of the batter cell is not supplied to the overcharge prevention circuit 100.

Therefore, since the power of the battery cell is not supplied to the overcharge prevention circuit 100 in the ignition-off state of the vehicle, the power of the battery cell is not consumed.

Figure 4:
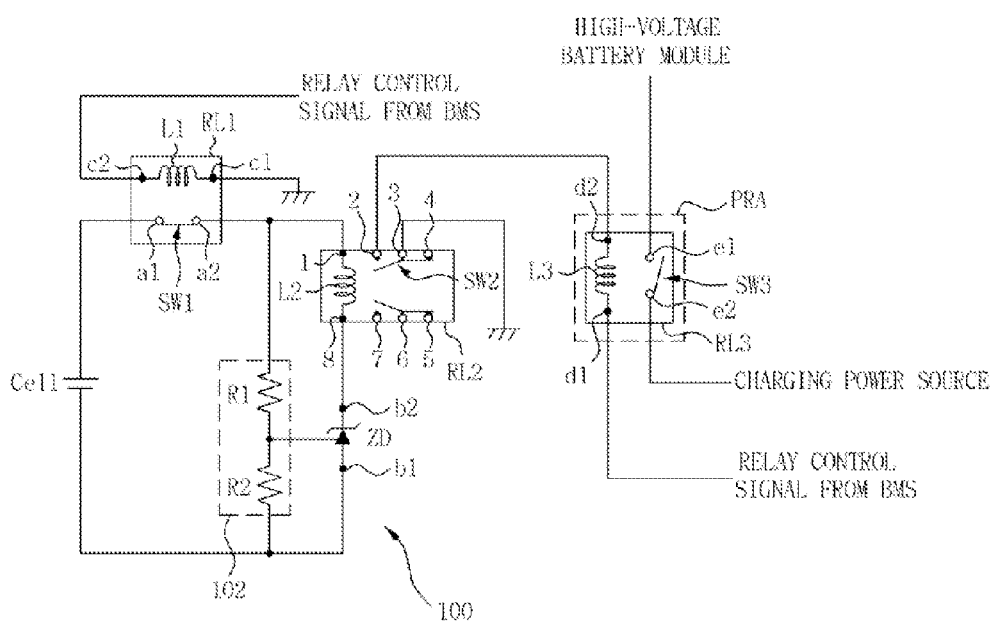
FIG. 4 is a diagram showing the operation of the overcharge protection apparatus with minimized power consumption, shown in FIG. 3, according to the second embodiment of the present invention in the case of overcharge.

FIG. 4 is a diagram showing the operation of an overcharge protection, apparatus with minimized power consumption shown in FIG. 3 according to the second embodiment of the present invention in the case of overcharge.

In the ignition-on state of the vehicle, a relay control signal from the battery management system (BMS) is a high-level voltage, so that current flows through the first coil L1 of the first relay RL1, thus causing the first switch SW1 to be closed.

When the first switch SW1 is closed, the voltage of the battery cell is applied to the overcharge prevention circuit 100, and then the overcharge prevention circuit 100 is normally operated.

The contact points 2 and 3 of the second relay RL2 implemented as the latching relay are initially electrically connected to each other, and are maintained in the initial state unless current flows through the second coil L2.

Therefore, in the ignition-on state of the vehicle, a relay control signal from the BMS is a high-level voltage, and current flows through the first coil L1 of the first relay RL1, so that the first switch SW1 is closed, and then current flows through the third coil L3 of the main relay RL3. Therefore, the third switch SW3 is closed, and then the high-voltage battery module is connected to the charging power source.

However, when the battery cell is overcharged and the voltage thereof is increased above, for example, 4.7 V, a voltage equal to or greater than the reference voltage is detected by the voltage detection unit 102, and the switching diode ZD is turned on, and then current flows through the second coil L2 of the second relay RL2. As a result, the contact points 3 and 4 of the second switch SW2 are electrically connected to each other, whereas the connection between the contact points 2 and 3 is released.

When the connection between the contact points 2 and 3 of the second switch SW2 is released, the contact point 2 is disconnected from the ground, and current does not flow through the third coil L1. As a result, the third switch SW3 is opened, and the supply of power from the charging power source to the high-voltage battery module is interrupted to prevent overcharge, thus preventing the ignition and explosion of the high-voltage battery module.

In the second embodiment of the present invention, the second relay RL2 is implemented as a latching relay. The latching relay is continuously maintained in its current state unless reverse current flows through the second coil L2.

Accordingly, when the battery cell is overcharged, the state of the second relay RL2 is not changed, so that the connection between the contact points 2 and 3 of the second relay RL2 is continuously maintained in a released state, and the supply of power from the charging power source to the high-voltage battery module is continuously interrupted, thus preventing the overcharge of the battery cell.

As described above, in accordance with the second embodiment of the present invention, the first relay RL1 is turned on only in the ignition-on state of the vehicle, that is, only when the battery is used, so that the power from the battery cell is supplied to the overcharge prevention circuit 100. In the ignition-off state of the vehicle, the first relay RL1 is turned of so that the power from the battery cell is not supplied to the overcharge prevention circuit 100. Accordingly, the power consumption of the battery cell is minimized and the voltage difference between cells is reduced, thus preventing the lifespan of the battery from being shortened.

In accordance with the embodiment of the present invention, the voltage of each battery cell is detected only in the ignition-on state of a vehicle, and power consumption is minimized, thus preventing the lifespan of the battery from being shortened by reducing the voltage difference between cells.

Although exemplary embodiments of the present invention have been illustrated and described, the present invention is intended to describe the present invention in detail. The present invention is not limited by those embodiments, and it is apparent that various modifications or improvements may be practiced by those skilled in the an to which the present invention pertains without departing from the scope and spirit of the invention.

Simple modifications or changes of the present invention belong to the scope of the present invention, and the detailed scope of the present invention should be defined by the accompanying claims.

What is claimed is:

1. An overcharge protection apparatus with minimized power consumption, comprising:
   a switching unit for controlling supply of voltage of a battery cell depending on an ignition-on or off state of a vehicle, the switching unit including a first relay; and
   an overcharge prevention circuit for, when the battery cell is overcharged based on the voltage of the battery cell, which is supplied through the switching unit, turning off a main relay to interrupt supply of power to a battery module,
   wherein the first relay comprises:
      a first coil to which a current is applied depending on the ignition-on or off state of a vehicle; and
      a first switch having a first end connected to a first electrode of the battery cell, wherein the overcharge prevention circuit comprises:
      a voltage detection unit connected between a second end of the first switch and a second electrode of the battery cell, and configured to detect the voltage of the battery cell;
      a switching diode having a first end connected to the second electrode of the battery cell, and configured to be shorted when the voltage of the battery cell detected by the voltage detection unit is equal to or greater than a reference voltage; and
      a second relay including a second coil connected between the second end of the first switch and a second end of the switching diode, and a second switch connected between a first end of the first coil and a ground.

2. The overcharge protection apparatus of claim 1, wherein the main relay comprises:

a third coil having a first end provided with a relay control signal from a battery management system and a second end connected to a second end of the first coil, and a third switch connected between the battery module and a charging power source.

3. The overcharge protection apparatus of claim 2, wherein the relay control signal is at a low level in the ignition-off state of the vehicle, and is at a high level in the ignition-on state of the vehicle.

4. The overcharge protection apparatus of claim 3, wherein:

when current does not flow through the second coil of the second relay, the first end of the first coil is connected to the ground, and when current flows through the second coil of the second relay, the first end of the first coil is disconnected from the ground.

5. The overcharge protection apparatus of claim 4, wherein the second switch continuously maintains a connection of the first end of the first coil and the ground unless reverse current flows through the second coil.

6. An overcharge protection apparatus with minimized power consumption, comprising:

a switching unit for controlling supply of voltage of a battery cell depending on an ignition-on or off state of a vehicle, the switching unit including a first relay; and an overcharge prevention circuit for, when the battery cell is overcharged based on the voltage of the battery cell, which is supplied through the switching unit, turning off a main relay to interrupt supply of power to a battery module, wherein the first relay comprises:

a first coil to which a current is applied depending on the ignition-on or off state of a vehicle, a first end of the first coil being connected to a ground, and a second end of the first coil being provided with a relay control signal from a battery management system; and a first switch having a first end connected to a first electrode of the battery cell, wherein the overcharge prevention circuit comprises:

a voltage detection unit connected between a second end of the first switch and a second electrode of the battery cell, and configured to detect the voltage of the battery cell;

a switching diode having a first end connected to the second electrode of the battery cell, and configured to be shorted when the voltage of the battery cell detected by the voltage detection unit is equal to or greater than a reference voltage; and a second relay including a second coil connected between the second end of the first switch and a second end of the switching diode, and a second switch connected between the main relay and the ground, wherein the main relay comprises:

a third coil having a first end provided with the relay control signal and a second end connected to the second switch; and a third switch connected between the battery module and a charging power source.

7. The overcharge protection apparatus of claim 6, wherein the relay control signal is at a low level in an ignition-off state of the vehicle and is at a high level in an ignition-on state of the vehicle.

* * * * *